(12) United States Patent
Eddlemon et al.

(10) Patent No.: US 12,137,085 B2
(45) Date of Patent: Nov. 5, 2024

(54) SYSTEMS AND METHODS FOR KEY ROTATION

(71) Applicant: Change Healthcare Holdings, LLC, Nashville, TN (US)

(72) Inventors: Travis Eddlemon, Edmonds, WA (US); Trevel Beshore, Davis, CA (US); Daniel Prinslow, Denver, CO (US)

(73) Assignee: Change Healthcare Holdings, LLC

( * ) Notice: Subject to any disclaimer, the term of this patent is extended or adjusted under 35 U.S.C. 154(b) by 212 days.

(21) Appl. No.: 17/519,160

(22) Filed: Nov. 4, 2021

(65) Prior Publication Data

US 2023/0139874 A1 May 4, 2023

(51) Int. Cl.
*H04L 29/06* (2006.01)
*H04L 9/40* (2022.01)

(52) U.S. Cl.
CPC .................. *H04L 63/068* (2013.01)

(58) Field of Classification Search
None
See application file for complete search history.

(56) References Cited

U.S. PATENT DOCUMENTS

| | | | | |
|---|---|---|---|---|
| 10,523,434 | B1* | 12/2019 | Sharifi Mehr | H04L 9/0891 |
| 10,530,578 | B2* | 1/2020 | Keshava | G06F 12/1466 |
| 10,581,820 | B2* | 3/2020 | Keshava | H04L 9/0894 |
| 10,601,782 | B2* | 3/2020 | Shetty | H04L 67/10 |
| 11,770,863 | B2* | 9/2023 | Mandapaka | H04B 17/318 709/227 |
| 2017/0331802 | A1* | 11/2017 | Keshava | H04L 9/0894 |
| 2018/0082076 | A1* | 3/2018 | Murray | H04L 63/10 |
| 2021/0014056 | A1* | 1/2021 | Agarwal | H04L 9/0891 |
| 2021/0377020 | A1* | 12/2021 | Kashid | H04L 9/083 |
| 2022/0019367 | A1* | 1/2022 | Freilich | G06F 3/067 |
| 2022/0035714 | A1* | 2/2022 | Schultz | G06F 11/3409 |
| 2022/0094530 | A1* | 3/2022 | Sreeravindra | H04L 9/0861 |
| 2022/0263655 | A1* | 8/2022 | Murray | H04L 63/0823 |

OTHER PUBLICATIONS

Xiong, Sisi et al. kBF: Towards Approximate and Bloom Filter based Key-Value Storage for Cloud Computing Systems. IEEE Transactions on Cloud Computing, vol. 5, Issue: 1. https://ieeexplore.ieee.org/stamp/stamp.jsp?tp=&arnumber=6995996 (Year: 2017).*

(Continued)

*Primary Examiner* — Jeremiah L Avery
(74) *Attorney, Agent, or Firm* — MARSHALL, GERSTEIN & BORUN LLP

(57) ABSTRACT

In an embodiment, systems and methods for rotating keys is provided. A key rotation process is performed on a cloud-based computing platform either on a scheduled basis or on request of a user or administrator. As part of the key rotation process, key pairs associated with cloud resources are identified. Of the identified key pairs, keys that are not currently being used in a key vault are identified and rotated. For identified key pairs where both keys are currently being used, an instruction is sent to the associated resources to switch to a second key of the key pair. The first key will then be rotated the next time the rotation process is executed.

18 Claims, 5 Drawing Sheets

(56) References Cited

OTHER PUBLICATIONS

Gascon-Samson, Julien et al. CacheDOCS: A Dynamic Key-Value Object Caching Service. 2017 IEEE 37th International Conference on Distributed Computing Systems Workshops (ICDCSW). https://ieeexplore.ieee.org/stamp/stamp.jsp?tp=&arnumber=7979851 (Year: 2017).*

Bhandari, Akshita et al. A framework for data security and storage in Cloud Computing. 2016 International Conference on Computational Techniques in Information and Communication Technologies (ICCTICT). https://ieeexplore.IEEE.org/stamp/stamp.jsp?tp=&arnumber=7514542 (Year: 2016).*

* cited by examiner

SYSTEMS AND METHODS FOR KEY ROTATION

BACKGROUND

In a cloud-computing environment, such as a Microsoft® Azure® environment, keys are distributed and are used to access resources such as a databases and services. For security reasons, it is recommended that keys be frequently rotated to ensure that the resources are not accessed by malicious or unauthorized entities.

While rotating keys is desirable, currently key rotation must be done on a key-by-key basis. There is no way to rotate all of the keys at once or adjust the frequency of key rotation. This is particularly problematic in cases where a security compromise is known to have taken place.

SUMMARY

In an embodiment, systems and methods for rotating keys are provided. A key rotation process is performed on a cloud-based computing platform either on a scheduled basis or on request of a user or administrator. As part of the key rotation process, key pairs associated with cloud resources are identified. Of the identified key pairs, keys that are not currently being used in a key vault are identified and rotated. For identified key pairs where both keys are currently being used, an instruction is sent to the associated resources to switch to a second key of the key pair. The first key will then be rotated the next time the rotation process is executed.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying figures, which are incorporated herein and form part of the specification, illustrate a key rotation system and method. Together with the description, the figures further serve to explain the principles of the key rotation system and method described herein and thereby enable a person skilled in the pertinent art to make and use the key rotation system and method.

DETAILED DESCRIPTION

Figure 1:
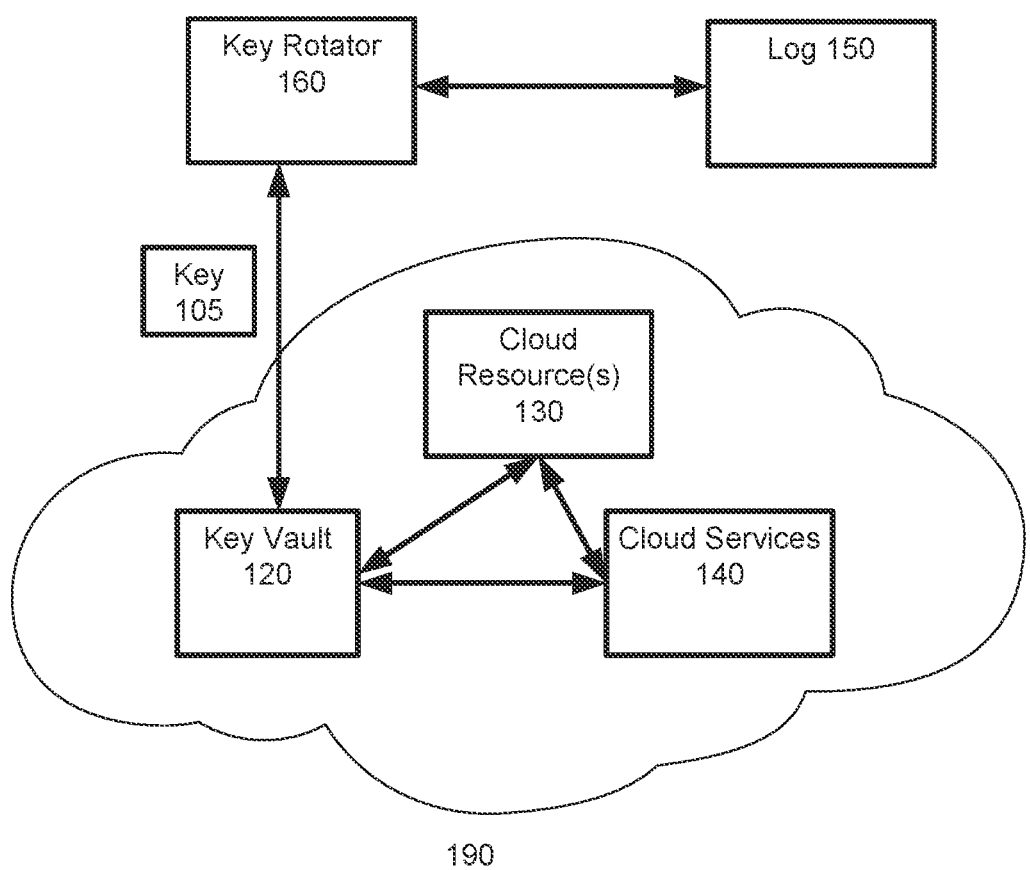
FIG. 1 is an example environment for rotating keys.

FIG. 1 is an example computing environment 100 for providing key rotation services in a cloud-computing system 190. As shown, the environment 100 includes a key rotator 160 and the cloud-computing system 190 communicating through a network. The network may include a combination of public and private networks. While shown as separate, in some embodiments, the key rotator 160 may be implemented as part of the cloud-computing system 190.

The cloud-computing system 190 may include one or more cloud resources 130 and cloud services 140. The cloud resources 130 may include storage and database resources that are made available to the cloud services 140. The cloud services 140 may include applications, programs, and services that execute on the cloud-computing system 190. The cloud-computing system 190 may be made up of one or more general purpose computing devices such as the computing device 500 illustrated with respect to FIG. 5.

The cloud-computing environment 190 may further include a key vault 120. The key vault 120 may store secrets that are currently being used to access the cloud resources 130. One type of secret is a key 105. However, other types of secrets may be supported.

Each key 105 in the key vault 120 may be associated with one or more tags. The tags may be metadata that describe the key 105 such as the cloud resources 130 that use the key 105, and a date and time when the key was created. Other information may be included.

The key vault 120 may provide keys 105 to the cloud services 140 to access the corresponding cloud resources 130. When a cloud service 140 needs to write to a cloud resource 130, such as a database, the cloud service 140 requests the key 105 from the key vault 120. After authenticating the cloud service 140, the key vault 120 may provide the requested key 105 to the cloud service 140. As may be appreciated, the key vault 120 provides security to the cloud resources 130 because the keys 105, and other secrets, are stored in the protected key vault 120 rather than by each of the cloud services 140.

Rather than use a single key 105, each cloud resource 130 may be accessed using either key 105 of a key pair. One or both of the keys 105 of a key pair that are provided to a cloud service 140 may be stored in the key vault 120. Only keys 105 of the key pair that have been provided to cloud services 140 may be stored in the key vault 120.

As described above, in order to provide increased security, the keys 105 used to access the cloud resources 130 may be periodically rotated. Key rotation is when a key 105 is retired and replaced with a new key 105.

In order to allow for more flexible key rotation and for the scheduled batch rotation of keys 105, the environment 100 may further include the key rotator 160. The key rotator 160 may be a service or application that replaces one or both keys 105 of a key pair. The key rotator 160 may rotate keys 105 on demand (i.e., when requested by a user or administrator) or according to a schedule (e.g., every day, every week, or every month).

The key rotator 160 may maintain a log 150 regarding the rotation of the keys 105 in the cloud-computing system 190. The log 150 may include an entry for each key 120 that is rotated along with the date of the rotation. The log 150 may be used to show compliance with key rotation policies, as well as to determine when it is time to rotate a particular key 105.

When the key rotator 160 is invoked (either as scheduled or by a user or administrator), the key rotator 160 may first determine the key pairs that are assigned to the cloud resources 130. Depending on the embodiment, the key rotator 160 may determine the key pairs by querying the cloud resources 130. Any technique for determining the keys 105 assigned to cloud resources 130 may be used.

After determining the assigned key pairs, the key rotator 160 may determine, for each of the assigned key pairs, which if any of the keys 105 of the key pairs are currently in use by a cloud service 140. A key 105 may be considered in use by a cloud service 140 if the key 105 appears in the key vault 120. Depending on the embodiment, the key rotator 160 may search for the keys 105 in the key vault 120 using the tags associated with each key 105.

For key pairs where none of the keys 105 were found to be in use by the key rotator 160, the key rotator 160 may rotate both keys 105 of the key pair. Depending on the embodiment, the key rotator 160 may rotate a key 105 by calling a function associated with the cloud-computing environment 190 that generates a new key 105. After generating both new keys 105 for a key pair, the key rotator 160 may update a configuration associated with the cloud resource 130 that uses the key pair.

In some embodiments, the key rotator 160 may generate a new key 105 for a cloud resource 130 by adding a record with the action "regenerate key" with an identifier of the resource 130, a name or identifier of each updated key 105, and a pipeline identifier. The pipeline identifier may be used to identify the record. The cloud resource 130 may then use the new keys 105 of the key pair. In addition, the key rotator 160 may update the log 150 with information about each new key 105 that was generated and may update the key vault 120 with the new keys 150.

For key pairs where only one of the keys 105 were found to be in use by the key rotator 160, the key rotator 160 may rotate only the unused key 105 of the key pair as described above. After generating a new key 105 for a key pair, the key rotator 160 may update the configuration associated with the cloud resource 130 that uses the key pair. The cloud resource 130 may then use the new key 105 of the key pair. In addition, the key rotator 160 may update the log 150 with information about the new key 105 of the pair that was generated and may update the key vault 120.

For key pairs where both of the keys 105 are found to be in use by the key rotator 160, the key rotator 160 may not rotate any of the keys 105, because the keys 105 are in use and therefore rotating the keys 105 would cause one or more of the cloud services 140 to lose access to the cloud resources 130 with the key pair. Accordingly, rather than rotate the keys, the key rotator 160 may instruct all of the cloud services 140 to use the second (or first) key 105 of the key pair 105. Assuming all of the cloud services 140 begin using the second key 105 and stop using the first key 105, the next time that the key rotator 160 rotates the keys 105, the first key 105 of the key pair will be rotated.

In some embodiments, after rotating a key 105, the key rotator 160 may update the configuration of the corresponding cloud resource 130 by adding a record with the action "update configuration" with an identifier of the resource 130, a configuration that identifies the updated key 105, and the pipeline id. In response to updating the configuration of the resource 130, all cloud services 140 that use the resource 130 will be restarted by the cloud-computing system 190 automatically. Restarting the cloud services 140 may cause the cloud services to request the new keys 105 for their respective cloud resources 130.

Figure 2:
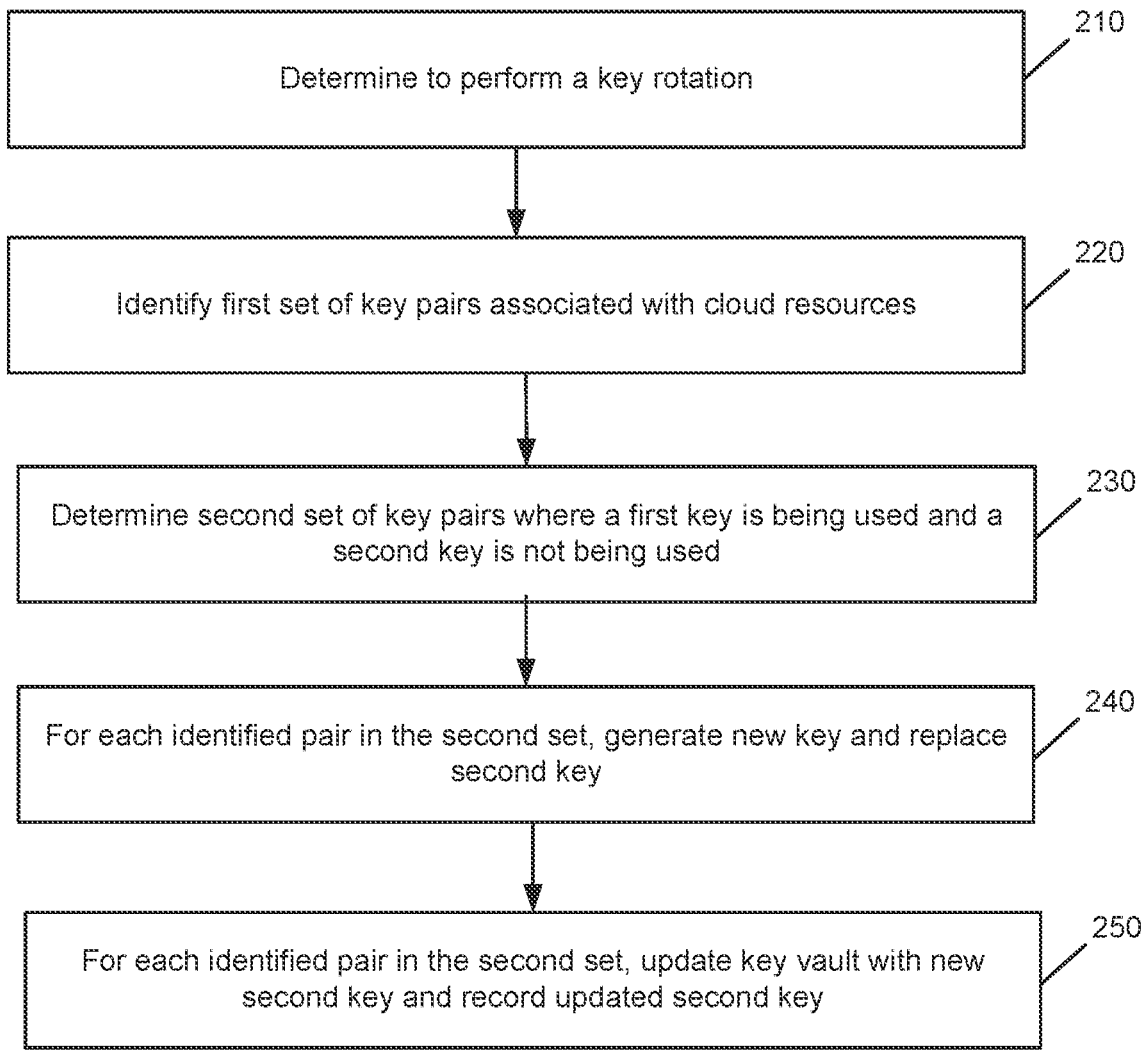
FIG. 2 is an illustration of an example method for generating and rotating keys where one key of a key pair is being used by a cloud resource.

FIG. 2 is an illustration of an example method for generating and rotating keys 105 where one key 105 of key pair is being used by a cloud resource 130. The method 200 may be implemented by the key rotator 160.

At 210, a determination to perform a key rotation is made. The determination may be made by the key rotator 160 based on an instruction from a user or administrator or based on a regularly scheduled key rotation. The keys 105 may be access keys used to access each of a plurality of cloud resources 130 available in a cloud-computing system 190.

At 220, a first set of key pairs associated with cloud resources are determined. The associated key pairs may be determined by the key rotator 160. In some embodiments, the associated key pairs may be determined by the key rotator 160 querying the cloud resources 130 and/or the cloud services 140 that access the cloud resources 130. The cloud resources 130 may be all of the cloud resources 130 executing on the cloud-computing system, or some subset of the cloud resources 130. For example, the cloud resources 130 may be the cloud resources 130 associated with keys 105 that are older than a specified amount of time (e.g., 30 days, 60 days, or 90 days) as indicated by the log 150.

At 230, a second set of key pairs where a first key of the associated key pair is being used and the second key of the associated key pair is not being used are identified, where the second set of key pairs is a subset of the first set and may include some or all of the associated key pairs. The second set of key pairs 105 may be identified by the key rotator 160. In some embodiments, the key rotator 160 may search for each key 105 of each key pair in the key vault 120. If a key 105 is in the key vault 120 it indicates that the key 105 is being used by one or more cloud services 140. If a key 105 is not in the key vault 120, then the key 105 is not being used by any cloud services 140.

At 240, for each identified key pair in the second set, a new key is generated. The new key 105 may be generated by the key rotator 160. The new key 105 may replace the unused second key in the key pair. The key rotator 160 may generate a new key 105 for a cloud resource 130 by adding a record with action "regenerate key" with an identifier of the resource 130, a name or identifier of each updated key 105, and a pipeline identifier.

At 250, for each identified key pair in the second set, the key vault is updated with the new second key. The key vault 120 may be updated by the key rotator 160 adding a record of the new second key 105 to the key vault 120. The key rotator 160 may further provide each updated second key 105 to the associated cloud resource 130. In addition, the key rotator 160 may update the log 150 to indicate that the key 105 was rotated and the date of the rotation.

Figure 3:
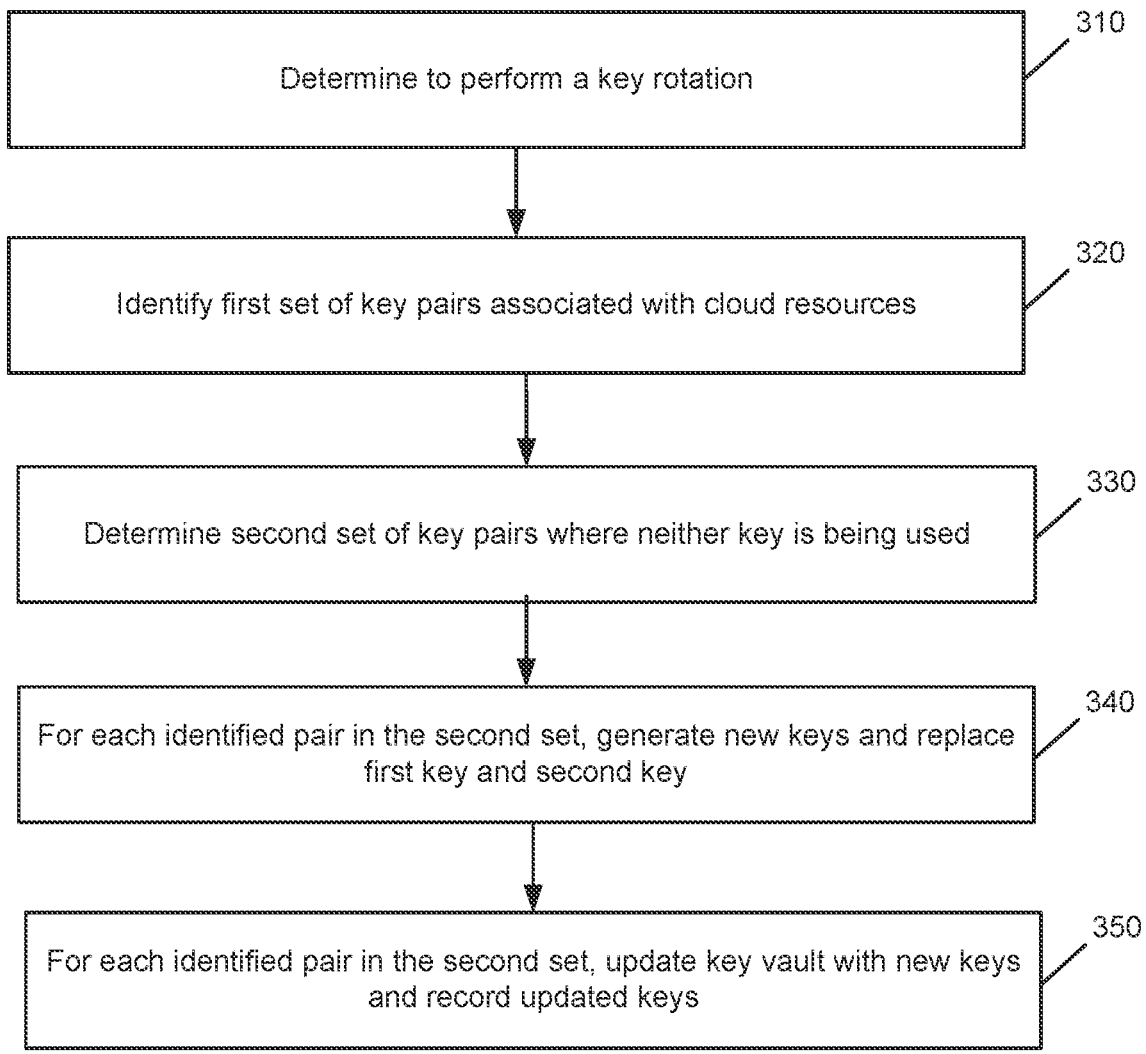
FIG. 3 is an illustration of an example method for generating and rotating keys where neither key of the key pair is being used by a cloud resource.

FIG. 3 is an illustration of an example method for generating and rotating keys 105 where neither key 105 of a key pair is being used by a cloud resource 130. The method 300 may be implemented by the key rotator 160.

At 310, a determination to perform a key rotation is made. The determination may be made by the key rotator 160 based on an instruction from a user or administrator or based on a regularly scheduled key rotation.

At 320, a first set of key pairs associated with cloud resources are determined. The associated key pairs may be determined by the key rotator 160. Any method for identifying key pairs may be used.

At 330, a second set of key pairs where neither key of the associated key pair is being used are identified where the second set of key pairs is a subset of the first set and may include some or all of the associated key pairs. The second set of key pairs 105 may be identified by the key rotator 160. In some embodiments, the key rotator 160 may search for each key 105 of each associated key pair in the key vault 120. If a key 105 is in the key vault 120 it indicates that the key is being used by one or more cloud services 140. If a key 105 is not in the key vault 120, then the key 105 is not being used by one or more cloud services 140.

At 340, for each identified key pair of the second set, a new keys are generated. Each new key 105 may be generated by the key rotator 160. The new keys 105 may replace both the first key and the second key in the key pair. The key rotator 160 may generate each new key 105 for a cloud resource 130 by adding a record with action "regenerate key" with an identifier of the resource 130, a name or identifier of each updated key 105, and a pipeline identifier.

At 350, for each identified key pair of the second set, the key vault is updated with the new first key and second key. The key vault 120 may be updated by the key rotator 160 adding a record of the new first and second keys 105 to the key vault 120. The key rotator 160 may further provide each updated key 105 to the associated cloud resource 130. In addition, the key rotator 160 may update the log 150 to indicate that each key 105 was rotated and the date of the rotation.

Figure 4:
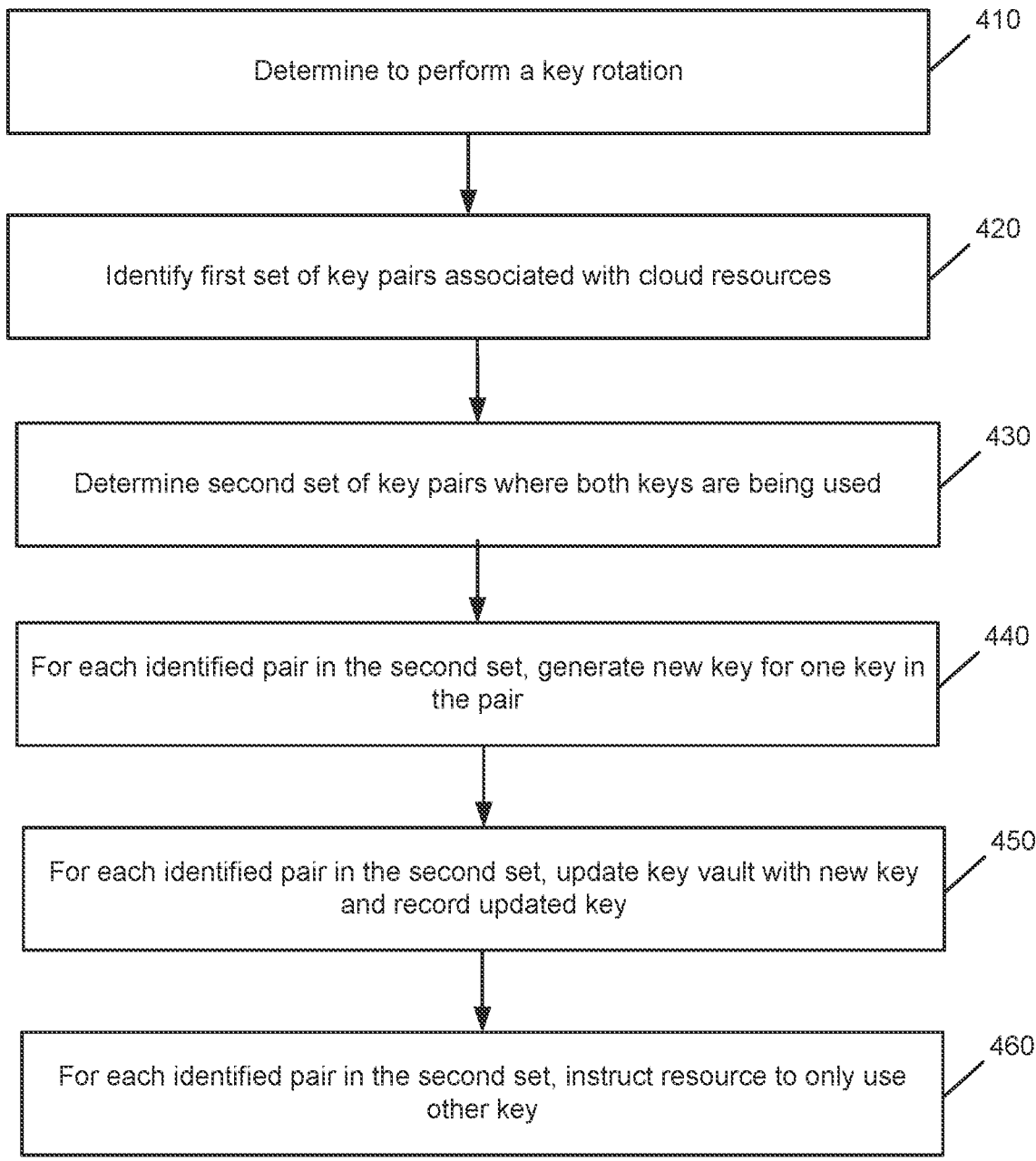
FIG. 4 is an illustration of an example method for generating and rotating keys where both keys of a key pair are being used by a cloud resource.

FIG. 4 is an illustration of an example method for generating and rotating keys 105 where both keys are being used by a cloud resource 130. The method 400 may be implemented by the key rotator 160.

At 410, a determination to perform a key rotation is made. The determination may be made by the key rotator 160 based on an instruction from a user or administrator or based on a regularly scheduled key rotation.

At 420, a first set of key pairs associated with cloud resources are determined. The associated key pairs may be determined by the key rotator 160. Any method for identifying key pairs may be used.

At 430, a second set of key pairs where both keys of the key pair are being used are identified, where the second set of key pairs is a subset of the first set and may include some or all of the associated key pairs. The second set of key pairs 105 may be identified by the key rotator 160. In some embodiments, the key rotator 160 may search for each key 105 of each associated key pair in the key vault 120. If a key 105 is in the key vault 120 it indicates that the key is being used by one or more cloud services 140. If a key 105 is not in the key vault 120, then the key 105 is not being used by one or more cloud services 140.

At 440, for each identified key pair of the second set, a new key is generated for one of the keys in the pair. The new key 105 for the pair may be generated by the key rotator 160. The new key 105 may replace the first key in the pair, for example. The key rotator 160 may generate the new first key 105 for a cloud resource 130 by adding a record with action "regenerate key" with an identifier of the resource 130, a name or identifier of each updated key 105, and a pipeline identifier.

At 450, for each identified key pair of the second set, the key vault is updated with the new first key. The key vault 120 may be updated by the key rotator 160 adding a record of the new first key 105 to the key vault 120. The key rotator 160 may further provide the updated first key 105 to the associated cloud resource 130. In addition, the key rotator 160 may update the log 150 to indicate that the first key 105 was rotated and the date of the rotation.

At 460, for each identified key pair of the second set, an instruction is sent to the resource to use the first key. The instruction may be sent to the cloud resource 130 by the key rotator 160. The instruction may update a configuration associated with the associated cloud resource 130 which may cause the cloud resource 130 to use the first key instead of the second key. The next time that the key rotation is performed the second key 105 will then be rotated because only the first key 105 will be in use.

Figure 5:
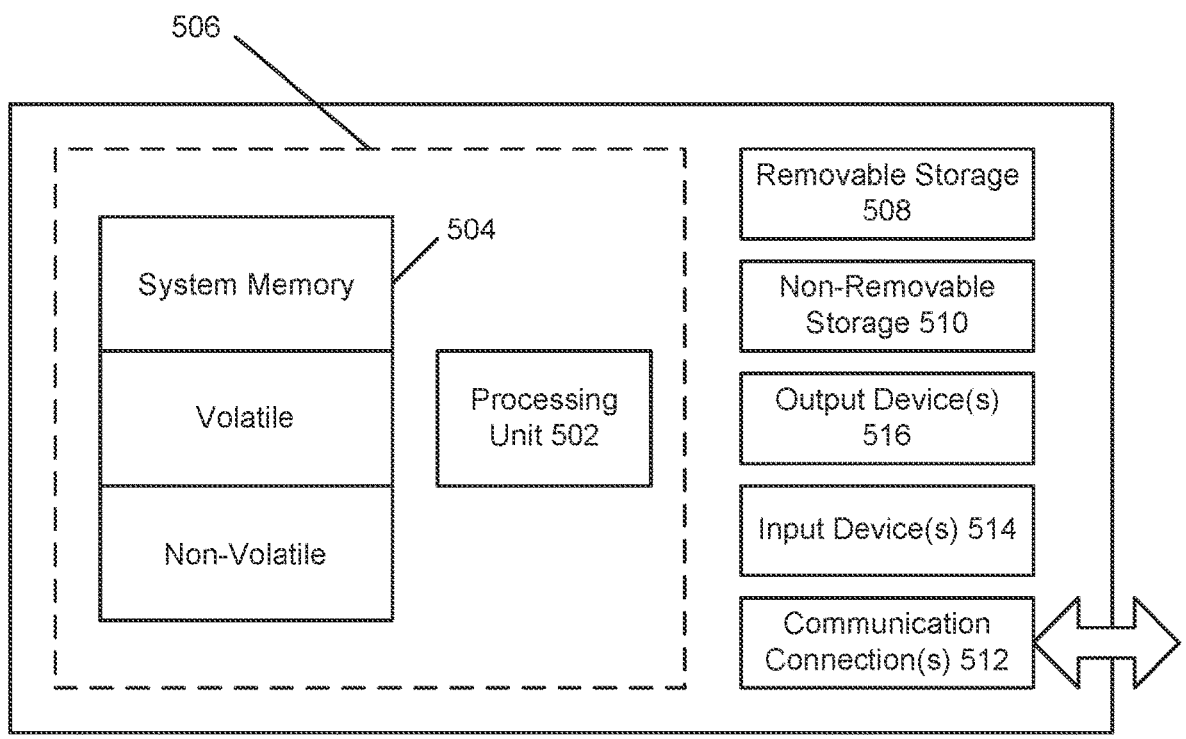
FIG. 5 shows an exemplary computing environment in which example embodiments and aspects may be implemented.

FIG. 5 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by the device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   determining, by one or more processors, to perform a key rotation;
   in response to the determination, identifying, by the one or more processors, key pairs associated with a plurality of cloud resources, wherein each key pair of the identified key pairs (1) comprises a first key and a second key and (2) is usable by a cloud service of a plurality of cloud services to access a cloud resource, among the plurality of cloud resources, associated with the key pair, and further wherein the plurality of cloud resources each comprise one of applications, programs, or services;
   from among the identified key pairs, determining, by the one or more processors, a first subset of key pairs where the first key of each key pair of the first subset of key pairs was provided to any cloud service of the plurality of cloud services and the second key of each key pair of the first subset of key pairs was not provided to any cloud service of the plurality of cloud services; and
   for each key pair of the determined first subset of key pairs:
   generating, by the one or more processors, a new key;
   replacing, by the one or more processors, the second key in the key pair with the new key;
   updating, by the one or more processors, the second key in a key vault; and
   recording, by the one or more processors, the updated second key.

2. The method of claim 1, wherein determining, by the one or more processors, the first subset of key pairs where the first key of each key pair of the first subset of key pairs was provided to any cloud service of the plurality of cloud services and the second key of each key pair of the first subset of key pairs was not provided to any cloud service of the plurality of cloud services comprises determining the key pairs of the identified key pairs where the first key of the key pair is in the key vault and the second key of the key pair is not in the key vault.

3. The method of claim 1, further comprising:
   from among the identified key pairs, determining, by the one or more processors, a second subset of key pairs where the first key of each key pair of the second subset of key pairs was not provided to any cloud service of the plurality of cloud services and the second key of each key pair of the second subset of key pairs was not provided to any cloud service of the plurality of cloud services; and
   for each key pair of the determined second subset of the identified key pairs:
   generating, by the one or more processors, a first new key;
   replacing, by the one or more processors, the first key in the key pair of the determined second subset of key pairs with the first new key;
   updating, by the one or more processors, the first key in the key vault;
   generating, by the one or more processors, a second new key;
   replacing, by the one or more processors, the second key in the key pair of the determined second subset of key pairs with the second new key;
   updating, by the one or more processors, the second key in the key vault; and
   recording, by the one or more processors, the updated first key and second key.

4. The method of claim 1, further comprising:
   from among the identified key pairs, determining, by the one or more processors, a second subset of key pairs where the first key of each key pair of the second subset of key pairs was provided to any cloud service of the plurality of cloud services and the second key of each key pair of the second subset of key pairs was provided to any cloud service of the plurality of cloud services; and
   for each key pair of the determined second subset of key pairs:
   instructing any cloud service provided the keys of the key pair of the second subset of key pairs to use only the second key of the key pair of the second subset of key pairs.

5. The method of claim 1, wherein determining to perform the key rotation comprises receiving an instruction to perform the key rotation from a scheduler process or an administrator.

6. The method of claim 1, wherein identifying the key pairs associated with a plurality of cloud resources comprises identifying the key pairs based on tags associated with each key pair.

7. A system comprising:
one or more processors; and
a non-transitory computer-readable medium storing computer-executable instructions that when executed by the one or more processors cause the one or more processors to:
determine to perform a key rotation;
in response to the determination, identify key pairs associated with a plurality of cloud resources, wherein each key pair of the identified key pairs (1) comprises a first key and a second key and (2) is usable, by a cloud service of a plurality of cloud services to access a cloud resource, among the plurality of cloud resources, associated with the key pair, and further wherein the plurality of cloud resources each comprise one of applications, programs, or services;
from among the identified key pairs, determine a first subset of key pairs where the first key of each key pair of the first subset of key pairs was provided to any cloud service of the plurality of cloud services and the second key of each key pair of the first subset of key pairs was not provided to any cloud service of the plurality of cloud services; and
for each key pair of the determined first subset of key pairs:
generate a new key;
replace the second key in the key pair with the new key;
update the second key in a key vault; and
record the updated second key.

8. The system of claim 7, wherein, to determine the first subset of key pairs where the first key of each key pair of the first subset of key pairs was provided to any cloud service of the plurality of cloud services and the second key of each key pair of the first subset of key pairs was not provided to any cloud service of the plurality of cloud services, the system further comprises computer-executable instructions that when executed by the one or more processors cause the one or more processors to determine the key pairs of the identified key pairs where the first key of the key pair is in the key vault and the second key of the key pair is not in the key vault.

9. The system of claim 7, further comprising computer-executable instructions that when executed by the one or more processors cause the one or more processors to:
from among the identified key pairs, determine a second subset of key pairs where the first key of each key pair of the second subset of key pairs was not provided to any cloud service of the plurality of cloud services and the second key of each key pair of the second subset of key pairs was not provided to any cloud service of the plurality of cloud services; and
for each key pair of the determined second subset of the identified key pairs:
generate a first new key;
replace the first key in the key pair of the determined second subset of key pairs with the first new key;
update the first key in the key vault;
generate a second new key;
replace the second key in the key pair of the determined second subset of key pairs with the second new key;
update the second key in the key vault; and
record the updated first key and second key.

10. The system of claim 7, further comprising computer-executable instructions that when executed by the one or more processors cause the one or more processors to:
from among the identified key pairs, determine a second subset of key pairs where the first key of each key pair of the second subset of key pairs was provided to any cloud service of the plurality of cloud services and the second key of each key pair of the second subset of key pairs was provided to any cloud service of the plurality of cloud services; and
for each key pair of the determined second subset of key pairs:
instruct any cloud service provided the keys of the key pair of the second subset of key pairs to use only the second key of the key pair of the second subset of key pairs.

11. The system of claim 7, wherein, to determine to perform the key rotation, the system further comprises computer-executable instructions that when executed by the one or more processors cause the one or more processors to receive an instruction to perform the key rotation from a scheduler process or an administrator.

12. The system of claim 7, wherein, to identify the key pairs associated with a plurality of cloud resources, the system further comprises computer-executable instructions that when executed by the one or more processors cause the one or more processors to identify the key pairs based on tags associated with each key pairs.

13. A non-transitory computer-readable medium storing computer-executable instructions that when executed by one or more processors cause the one or more processors to:
determine to perform a key rotation;
in response to the determination, identify key pairs associated with a plurality of cloud resources, wherein each key pair of the identified key pairs (1) comprises a first key and a second key and (2) is usable by a cloud service of a plurality of cloud services to access a cloud resource cloud resource, among the plurality of cloud resources, associated with the key pair, and further wherein the plurality of cloud resources each comprise one of applications, programs, or services;
from among the identified key pairs, determine a first subset of key pairs where the first key of each key pair of the first subset of key pairs was provided to any cloud service of the plurality of cloud services and the second key of each key pair of the first subset of key pairs was not provided to any cloud service of the plurality of cloud services; and
for each key pair of the determined first subset of key pairs:
generate a new key;
replace the second key in the key pair with the new key;
update the second key in a key vault; and
record the updated second key.

14. The computer-readable medium of claim 13, wherein, to determine the first subset of key pairs where the first key of each key pair of the first subset of key pairs was provided to any cloud service of the plurality of cloud services and the second key of each key pair of the first subset of key pairs was not provided to any cloud service of the plurality of cloud services, the computer-readable medium further comprises computer-executable instructions that when executed by the one or more processors cause the one or more processors to determine the key pairs of the identified key pairs where the first key of the key pair is in the key vault and the second key of the key pair is not in the key vault.

15. The computer-readable medium of claim 13, further comprising computer-executable instructions that when executed by the one or more processors cause the one or more processors to:
- from among the identified key pairs, determine a second subset of key pairs where the first key of each key pair of the second subset of key pairs was not provided to any cloud service of the plurality of cloud services and the second key of each key pair of the second subset of key pairs was not provided to any cloud service of the plurality of cloud services; and
- for each key pair of the determined second subset of the identified key pairs:
  - generate a first new key;
  - replace the first key in the key pair of the determined second subset of key pairs with the first new key;
  - update the first key in the key vault;
  - generate a second new key;
  - replace the second key in the key pair of the determined second subset of key pairs with the second new key;
  - update the second key in the key vault; and
  - record the updated first key and second key.

16. The computer-readable medium of claim 13, further comprising computer-executable instructions that when executed by the one or more processors cause the one or more processors to:
- from among the identified key pairs, determine a second subset of key pairs where the first key of each key pair of the second subset of key pairs was provided to any cloud service of the plurality of cloud services and the second key of each key pair of the second subset of key pairs was provided to any cloud service of the plurality of cloud services; and
- for each key pair of the determined second subset of key pairs:
  - instruct any cloud service provided the keys of the key pair of the second subset of key pairs to use only the second key of the key pair of the second subset of key pairs.

17. The computer-readable medium of claim 13, wherein, to determine to perform the key rotation, the computer-readable medium further comprises computer-executable instructions that when executed by the one or more processors cause the one or more processors to receive an instruction to perform the key rotation from a scheduler process or an administrator.

18. The computer-readable medium of claim 13, wherein, to identify the key pairs associated with a plurality of cloud resources, the computer-readable medium further comprises computer-executable instructions that when executed by the one or more processors cause the one or more processors to identify the key pairs based on tags associated with each key pair.

* * * * *

UNITED STATES PATENT AND TRADEMARK OFFICE
CERTIFICATE OF CORRECTION

PATENT NO. : 12,137,085 B2  
APPLICATION NO. : 17/519160  
DATED : November 5, 2024  
INVENTOR(S) : Travis Eddlemon et al.

Page 1 of 1

It is certified that error appears in the above-identified patent and that said Letters Patent is hereby corrected as shown below:

In the Claims

At Column 9, Line 16, "usable," should be -- usable --.

At Column 10, Line 32, "pairs." should be -- pair. --.

At Column 10, Line 42, "resource cloud resource," should be -- resource, --.

Signed and Sealed this  
Twenty-fifth Day of February, 2025

Coke Morgan Stewart  
*Acting Director of the United States Patent and Trademark Office*